Patented Aug. 1, 1944

2,354,784

UNITED STATES PATENT OFFICE 2,354,784

SUBSTITUTED p-p'-DIAMINO DIPHENYL SULPHONES AND A PROCESS OF MAKING THE SAME

Rudolf Tschesche, Berlin-Wilmersdorf, and Kurt Böhle, Berlin-Tempelhof, Germany, assignors to Schering Corporation, Bloomfield, N. J., a corporation of New Jersey No Drawing. Application April 6, 1940, Serial No. 328,240. In Germany April 8, 1939

15 Claims. (Cl. 260—397.6)

This invention relates to substituted p,p'-diamino diphenyl sulphones and a process of making the same.

p,p'-diamino diphenyl sulphone is known to be an excellent agent for combatting infections caused by streptococci and pneumococci; however, it possesses such a high toxicity that its clinical use has been given up. It has been attempted to overcome this disadvantage by transforming the sulphone into its acyl derivatives, especially into its diacetyl derivatives or into Schiff's bases, i. e. its reaction product with aldehydes; thereby, however, sufficient decrease in toxicity could not be achieved.

Now we have found that it is possible to decrease the toxicity of p,p'-diamino diphenyl sulphone and of its partial N-substituted derivatives without any loss of activity against bacterial infections, by reacting the same with formaldehyde in the presence of alcohols, preferably at room temperature. Thus, compounds are obtained according to the formulae

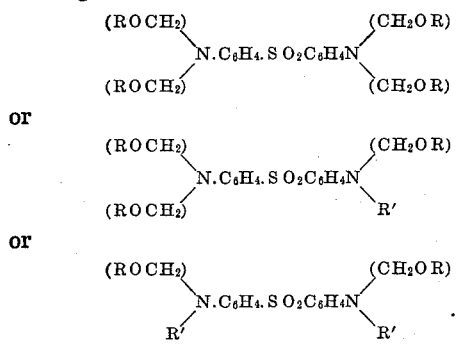

wherein R and R' represent the same or different alkyl radicals, preferably methyl radicals.

As starting material for the process according to this invention p,p'-diamino diphenyl sulphone or its derivatives mono-alkylated in one or both amino groups, may be employed, preferably its methyl substituted derivatives.

The following examples illustrate the invention, without, however, limiting the same to them.

Example 1

100 gs. of p,p'-diamino diphenyl sulphone are shaken with 700 ccs. of 95 per cent ethyl alcohol and 300 ccs. of a 35% formaldehyde solution at room temperature for 10 hours. The condensation product formed precipitates from the solution in crystalline form. For purification it is recrystallized from ethanol. Its melting point is 148–150° C, with slight decomposition. Yield: about 90%. It represents the (tetra-ethoxymethylene)-diamino diphenyl sulphone.

Example 2

10 gs. of p,p'-diamino diphenyl sulphone are shaken according to Example 1 with 100 ccs. of methanol and 50 ccs. of formaldehyde solution. The crystals precipitated are recrystallized from ethanol. M. P. 140–145° C. Yield: 90%. It represents the (tetra - methoxymethylene) - diamino diphenyl sulphone.

Example 3

100 gs. of p,p'-di(methylamino) - diphenylsulphone (French Patent No. 829,926, Example 10; Chem. Zentrallblatt, 1938, II, p. 3989), are shaken with 700 ccs. of 95% ethyl alcohol and 300 ccs. of a 35% formaldehyde solution at room temperature for 10 hours. The di-(ethoxymethylene methyl amino)-diphenyl sulphone formed thereby precipitates from the solution and is recrystallized from ethanol. M. P. 115–117° C. Yield: 80%.

Example 4

10 gs. of p-amino-p'-methyl-amino-diphenyl sulphone are shaken according to Example 3 with 100 ccs. of methanol and 50 ccs. of formaldehyde solution. The crystals precipitated consist of p,p'-(trimethoxymethylene methyl)-diamino diphenyl sulphone and show after recrystallization from alcohol a M. P. of 110–112° C. Yield: 80%.

The condensation may also be carried out at a higher temperature. Instead of ethanol or methanol also other aliphatic alcohols may be employed.

The products thus obtained are tolerated very well by animals and human beings. Their toxicity is lower than that of other hitherto known derivatives of this compound; the toxicity is, for instance, lower than that of dimethyl diamino diphenyl sulphone.

Of course, many changes and variations in the reaction conditions and the like may be employed by those skilled in the art in accordance with the principles set forth herein and in the claims annexed hereto.

What we claim is:

1. Process for the manufacture of N-substituted p,p'-diamino diphenyl sulphones, the substituent being a methylene ether group, comprising reacting a diamino diphenyl sulphone of the formula

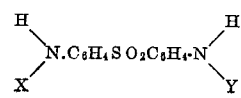

wherein X and Y are each a member of the group consisting of hydrogen and alkyl, with formaldehyde and an aliphatic alcohol until condensation of such three substances is effected.

2. Process for the manufacture of substituted p,p'-diamino diphenyl sulphones of the formula

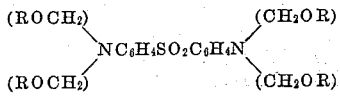

wherein R represents an alkyl radical, comprising reacting diamino diphenyl sulphone with formaldehyde and an aliphatic alcohol until condensation of such three substances is effected.

3. Process for the manufacture of substituted p,p'-diamino diphenyl sulphones of the formula

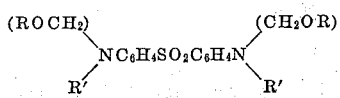

wherein R and R' represent alkyl radicals, comprising reacting a diamino diphenyl sulphone, in which both amino groups are substituted by R', with formaldehyde and an aliphatic alcohol until condensation of such three substances is effected.

4. Process for the manufacture of N-substituted p,p'-diamino diphenyl sulphones, the substituent being a methylene ether group, comprising reacting a diamino diphenyl sulphone of the formula

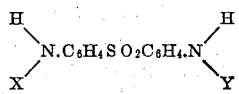

wherein X and Y are each a member of the group consisting of hydrogen and alkyl, with formaldehyde and an aliphatic alcohol at room temperature until condensation of such three substances is effected.

5. Process according to claim 1, in which the alcohol is ethanol.

6. Process according to claim 1, in which the alcohol is methanol.

7. Process according to claim 1, in which p,p'-di-(methyl amino)-diphenyl sulphone is employed as starting material.

8. Process according to claim 1, in which p,p'-diamino diphenyl sulphone is employed as starting material.

9. The (tetra ethoxy methylene) p,p'-diamino diphenyl sulphone of M. P. 148–150° C. with slight decomposition.

10. The (tetra methoxy methylene) p,p'-diamino diphenyl sulphone of M. P. 140–145° C.

11. The p,p'-di(ethoxy methylene methyl)-amino diphenyl sulphone of M. P. 115–117° C.

12. A p,p'-diamino-diphenyl-sulphone of the general formula

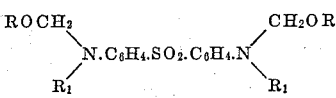

wherein R is an alkyl radical, and wherein R' represents a member of the group consisting of an alkyl radical and the group —CH$_2$OR.

13. A p,p'-diamino-diphenyl-sulphone which is N-substituted, in both of the amino groups, by the group —CH$_2$OR, R being an alkyl radical.

14. A p,p'-diamino-diphenyl-sulphone which is N-tetra-substituted by the group —CH$_2$OR, R being an alkyl radical.

15. A p,p'-diamino-diphenyl-sulphone which is N-substituted, in both of the amino groups, by the group —CH$_2$OR, R being an alkyl radical of no more than two carbon atoms.

RUDOLF TSCHESCHE.
KURT BÖHLE.